UNITED STATES PATENT OFFICE.

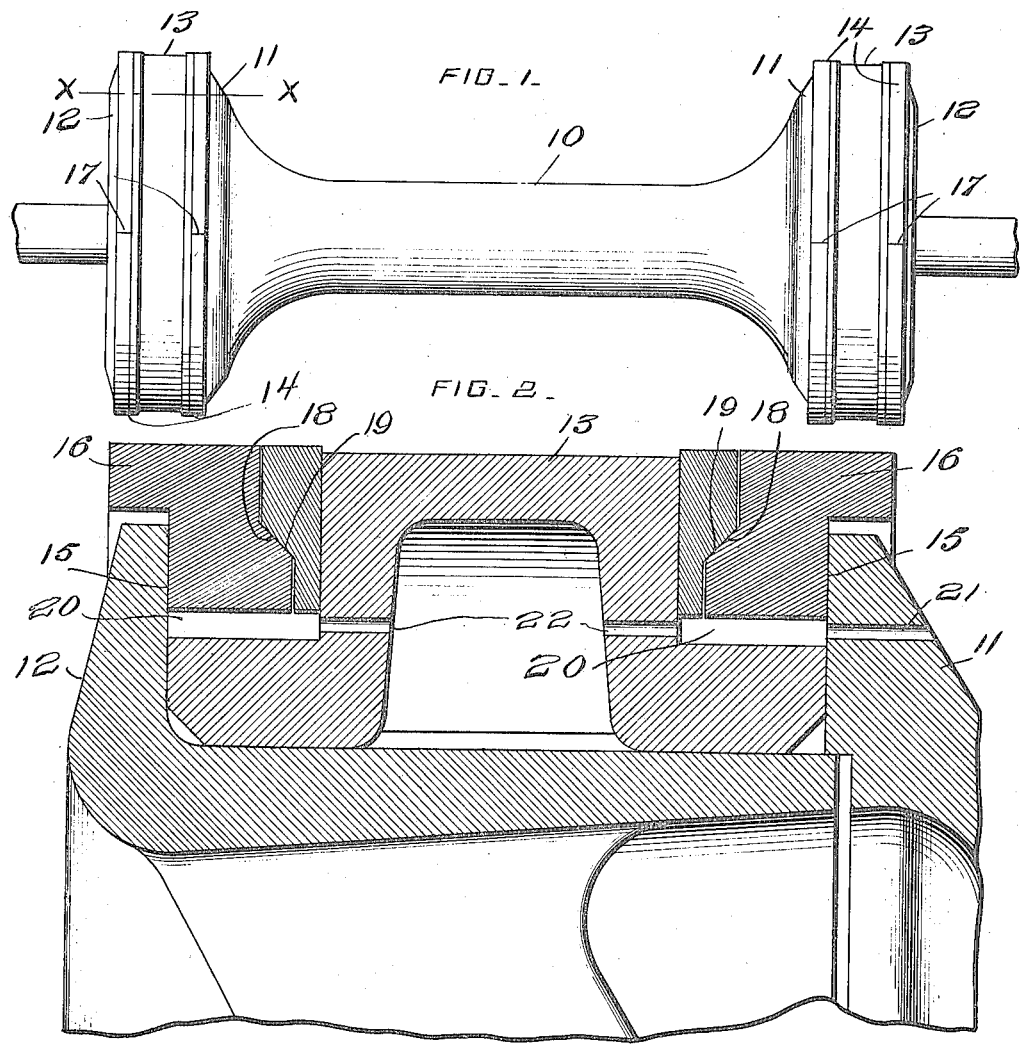

JOHN T. WILSON, OF JERSEY SHORE, PENNSYLVANIA.

PACKING FOR PISTON-VALVES.

1,145,730. Specification of Letters Patent. Patented July 6, 1915.

Application filed October 25, 1913. Serial No. 797,192.

*To all whom it may concern:*

Be it known that I, JOHN T. WILSON, a citizen of the United States, residing at Jersey Shore, in the county of Lycoming and State of Pennsylvania, have invented certain new and useful Improvements in Packings for Piston-Valves, of which the following is a specification.

The object of my invention is the production of a packing for piston valves wherein the snap ring cannot be pulled out of the groove in which it is located should an edge thereof catch in a port of the cage; which shall not be subjected to excessive side wear; which shall provide for the gradual expansion of the snap ring; which when steam is admitted and the valve is in use shall constitute a plug; which shall automatically adjust itself to the cage as the exterior surface of the packing wears away; which shall not have excessive frictional contact with the cage; and which shall be comprised of relatively few parts and be relatively cheap in first cost.

The invention consists in a packing comprising a snap ring and an integral ring, with beveled surfaces of relatively small areas, located side by side.

It further consists in certain novelties of construction and combinations of parts as herein set forth and claimed.

The accompanying drawing illustrates an example of the embodiment of the invention constructed according to the best mode of procedure I have so far devised for the purpose.

Figure 1 is a side view in elevation of a piston valve embodying the invention. Fig. 2 is an enlarged partial section of Fig. 1 on line $x$—$x$ showing the packing rings, bull ring, the follower and part of the spool in section.

Referring to the figures, 10 designates the spool; 11, 11, the flanges; 12, 12, the followers; 13, the bull rings; and 14 the packings located within grooves 15 between the bull rings and the flanges of the spool and followers.

Each packing comprises a snap ring 16 cut at 17 and fashioned to form a circumferential beveled surface 18 of limited area; and a solid integral ring fashioned to form a circumferential beveled surface 19 matching the beveled surface 18 of the snap ring.

A space 20 is provided beneath each packing so both the integral and snap rings can float or shift in the groove and contact with the interior surface of a cage when the spool is not actually centered. Steam is admitted to the under surfaces of the packings through the ports 21, 22, 22, or in any other way, to expand the snap rings against the cage.

The angle of the beveled surfaces 18, 19, and their areas will depend upon the pressure with which the snap ring is to be forced against the cage and the amount of wear of the beveled surfaces necessary to allow the snap ring to gradually expand, as the exterior surface of the snap ring wears away, so it will fit the cage and preserve a steam-tight joint. In use the beveled surfaces will wear away, as well as the vertical surfaces of the snap and integral rings and the surfaces of the bull ring and spool and follower flange, where they are in frictional contact, to a certain extent, due to the repeated expansion and contraction of the snap ring and the crowding of the rings against the walls when steam is admitted beneath the packing. If the snap ring be made of such a diameter that it will frictionally engage the cage and the beveled surface on the integral ring at the same time and when new and steam has expanded it, the packing will constitute a plug, and the exterior surface can wear only to a degree commensurate with the wear of the beveled surfaces of the two rings in contact.

Obviously, the snap ring will expand gradually as the beveled surfaces wear away and thus automatically adjust itself to the cage and at the same time the snap ring cannot be pulled from its groove or bear with excessive friction against the cage.

From the foregoing description taken in connection with the drawing it is clear that I have produced a relatively cheap packing of few parts which fulfils the condition set forth as the object of the invention.

I have illustrated a valve provided with a plurality of packings combined with bull rings but the invention may be embodied in a single packing or in other combinations than that illustrated, as may be desired.

What I claim is:

1. A valve body having a groove bounded by fixed walls and a packing within the groove and bearing against the surfaces of the walls bounding the groove, said packing comprising two rings only, a floating integral ring with a beveled surface and a floating snap ring with a beveled surface matching the beveled surface of the integral ring.

2. The combination with a spool having a groove with fixed walls, of a packing comprising a snap ring with a beveled surface and an integral ring with a beveled surface, both said rings floating, the beveled surfaces each being of less area than the area of the side surface of the ring, and each ring engaging a fixed wall.

3. A packing comprising a snap ring and an integral ring, both floating, each ring having part of a side surface at right angles to the longitudinal axis of the ring and an intermediate part of the surface at an oblique angle to said axis, the oblique surfaces of the rings being adapted to bear one against the other.

4. A piston valve having a bull ring and grooves between said ring and the spool flange and follower flange, and floating packings in said grooves, each packing comprised of a snap ring with a part of one side surface beveled and an integral ring with a part of one side surface beveled, the beveled surfaces matching each other, and the rings of each packing engaging fixed walls.

5. The combination with a piston valve having grooves, of floating packings, each packing comprised of an integral ring and an expansible or snap ring, said rings located side by side and interlocking, floating relative to the valve, and each ring in frictional contact with the surface of a fixed wall bounding a groove.

6. The combination with a piston valve having grooves, of floating packings, each packing comprised of an integral ring and an expansible or snap ring, said rings interlocking, floating, and each ring in frictional contact with the surface of a fixed wall bounding a groove; openings being provided in connection with the spool of the valve for the admission of live steam beneath the packing or snap ring.

7. A piston valve having a bull ring and grooves between said ring and the spool flange and follower flange, and floating packings in the grooves, each packing comprised of a snap ring and an integral ring engaging the surfaces of the spool flange and the follower flange, which rings interlock, and both said rings floating.

In testimony whereof I affix my signature in presence of two witnesses.

JOHN T. WILSON.

Witnesses:
S. B. HENRY,
C. C. YOUNG.